US006874982B2

United States Patent
Rhodes

(10) Patent No.: US 6,874,982 B2
(45) Date of Patent: Apr. 5, 2005

(54) CARGO-RETAINING BAR SUPPORT

(75) Inventor: David B. Rhodes, Redondo Beach, CA (US)

(73) Assignee: Mattel, Inc., El Segundo, CA (US)

( * ) Notice: Subject to any disclaimer, the term of this patent is extended or adjusted under 35 U.S.C. 154(b) by 0 days.

(21) Appl. No.: 10/712,909

(22) Filed: Nov. 12, 2003

(65) Prior Publication Data

US 2004/0156692 A1 Aug. 12, 2004

Related U.S. Application Data

(60) Provisional application No. 60/425,849, filed on Nov. 12, 2002, provisional application No. 60/433,929, filed on Dec. 16, 2002, and provisional application No. 60/454,847, filed on Mar. 14, 2003.

(51) Int. Cl.[7] .............................................. B61D 45/00
(52) U.S. Cl. ...................... 410/152; 410/151; 410/143
(58) Field of Search .................................. 410/121, 127, 410/129, 140, 141, 142, 143, 144, 151, 152; 248/214, 222.51, 222.12, 222.13

(56) References Cited

U.S. PATENT DOCUMENTS

| | | | |
|---|---|---|---|
| 969,002 A | 8/1910 | Teachout | |
| 1,238,874 A | * 9/1917 | Biela | ......................... 410/143 |
| 1,401,419 A | 12/1921 | McNally | |
| 1,951,660 A | 3/1934 | Klaudt | |
| 2,124,082 A | 7/1938 | Reifer | |
| 2,226,373 A | * 12/1940 | Frear | ......................... 410/151 |
| 2,414,160 A | 1/1947 | Moon | |
| 2,464,080 A | 3/1949 | Hankins | |
| 2,467,681 A | 4/1949 | McKinney | |
| 2,697,631 A | 12/1954 | Miller | |
| 2,752,864 A | 7/1956 | McDougal et al. | |
| 2,766,704 A | 10/1956 | McMahon | |
| 2,912,039 A | 11/1959 | Miner et al. | |
| 2,980,037 A | * 4/1961 | Elsner | ......................... 410/144 |
| 2,988,020 A | * 6/1961 | Stough | ......................... 410/152 |
| 3,170,217 A | * 2/1965 | Williams | ..................... 249/189 |
| 3,177,007 A | 4/1965 | Oren | |
| 3,344,750 A | 10/1967 | Kostrewa | |
| 3,367,286 A | * 2/1968 | Jantzen | ........................ 410/102 |
| 3,559,591 A | 2/1971 | Breen et al. | |
| 3,590,746 A | 7/1971 | Gibson | |
| 3,686,715 A | * 8/1972 | Brodnicki | ................ 24/68 CD |
| 3,712,663 A | 1/1973 | Laven | |
| 3,995,565 A | 12/1976 | Kersey | |
| 4,080,906 A | 3/1978 | Brown | |
| 4,264,251 A | 4/1981 | Blatt | |
| 4,278,376 A | 7/1981 | Hunter | |
| 4,343,578 A | * 8/1982 | Barnes | ........................ 410/151 |
| 4,396,325 A | 8/1983 | Joice-Cavanagh | |
| 4,413,761 A | * 11/1983 | Angel | ........................ 224/485 |
| 4,432,678 A | 2/1984 | Liebel | |

(Continued)

Primary Examiner—D. Glenn Dayoan
Assistant Examiner—H. Gutman
(74) Attorney, Agent, or Firm—Kolisch Hartwell, P.C.

(57) ABSTRACT

An adjustable cargo retaining system including a retaining member that is received by a retaining member support. A removable spacer urges the retaining member against the retaining member support.

32 Claims, 4 Drawing Sheets

U.S. PATENT DOCUMENTS

| | | | |
|---|---|---|---|
| 4,498,824 A | 2/1985 | Kinkle | |
| 4,756,498 A | 7/1988 | Frye | |
| 4,830,558 A | 5/1989 | Sweeney | |
| 4,846,610 A | 7/1989 | Schoenleben | |
| 4,880,342 A | 11/1989 | Pradovic | |
| 4,932,817 A | 6/1990 | Mattare | |
| 4,938,403 A | * 7/1990 | Cortelli | 224/310 |
| 4,955,771 A | 9/1990 | Bott | |
| 4,962,907 A | 10/1990 | Gary | |
| 4,982,922 A | * 1/1991 | Krause | 248/222.51 |
| 5,028,184 A | 7/1991 | Krause | |
| 5,032,045 A | 7/1991 | Calco | |
| 5,192,187 A | 3/1993 | Sweet | |
| 5,219,251 A | 6/1993 | Kanczuzewski | |
| 5,281,063 A | 1/1994 | Austin | |
| 5,320,464 A | 6/1994 | Long et al. | |
| 5,326,204 A | 7/1994 | Carlson et al. | |
| 5,378,093 A | 1/1995 | Schroeder | |
| 5,378,095 A | 1/1995 | Shultz | |
| 5,427,487 A | 6/1995 | Brosfske | |
| 5,443,342 A | 8/1995 | Huang | |
| 5,472,301 A | 12/1995 | Wallen | |
| 5,494,389 A | 2/1996 | Kanczuzewski | |
| 5,582,495 A | 12/1996 | Schroeder | |
| 5,688,087 A | 11/1997 | Stapleton et al. | |
| 5,769,580 A | 6/1998 | Purvis | |
| 5,785,475 A | 7/1998 | Winstel et al. | |
| 5,807,047 A | 9/1998 | Cox | |
| 5,813,647 A | 9/1998 | Chen | |
| 5,833,414 A | 11/1998 | Feldman et al. | |
| 5,876,165 A | 3/1999 | Campbell | |
| 5,890,856 A | 4/1999 | Huang | |
| 5,927,787 A | 7/1999 | Emery et al. | |
| 5,934,850 A | 8/1999 | Soumar et al. | |
| 5,941,667 A | 8/1999 | Hardison | |
| 5,944,464 A | 8/1999 | Cole, Jr. | |
| 5,947,666 A | 9/1999 | Huang | |
| 5,971,685 A | 10/1999 | Owens | |
| 5,988,962 A | 11/1999 | Santa Cruz et al. | |
| 5,988,963 A | 11/1999 | Shiau | |
| 5,997,228 A | 12/1999 | Potter | |
| 6,042,312 A | 3/2000 | Durham | |
| 6,062,782 A | 5/2000 | Huang | |
| 6,068,433 A | 5/2000 | Baloga | |
| 6,077,007 A | 6/2000 | Porter et al. | |
| 6,086,299 A | 7/2000 | Kanczuzewski | |

* cited by examiner

CARGO-RETAINING BAR SUPPORT

CROSS-REFERENCE TO RELATED APPLICATIONS

This application claims priority under 35 U.S.C. 119(e) to U.S. Provisional Patent Application No. 60/425,849 entitled "Cargo-Retaining Bar Support," filed Nov. 12, 2002; U.S. Provisional Patent Application No. 60/433,929 entitled "Cargo-Retaining Bar Support," filed Dec. 16, 2002; and U.S. Provisional Patent Application No. 60/454,847 entitled "Cargo-Retaining Bar Support," filed Mar. 14, 2003, the disclosures of which are incorporated herein by reference.

BACKGROUND

The present disclosure relates generally to cargo-retaining systems, and more specifically, to a support for a retaining member that may be attached easily to a wall of a truck or similar cargo area. Examples of cargo-retaining bars, supports, and housings that may be attached to a wall are disclosed in U.S. Pat. Nos. 4,830,558; 4,932,817; 4,962,907; 5,219,251; 5,281,063; 5,494,389; and 6,086,299, the disclosures of which are incorporated herein by reference.

SUMMARY

The present disclosure is directed to cargo retaining and positioning systems. In one embodiment, the system includes a retaining member that is received by a retaining member support, and a removable spacer that is insertable into the retaining member support and contacts adjacent edge surfaces of the retaining member. In some embodiments, the spacer is L-shaped to contact adjacent sides of the retaining member. In some embodiments, the system is adjustable to account for an unfilled or partially filled cargo area to prevent the cargo from shifting during shipping. This may be accomplished by selectively placing the system at any of a plurality of locations, including intermediate locations, within the cargo area. Furthermore, the disclosed retaining system may be configured to easily accommodate variations in retaining member dimensions.

DETAILED DESCRIPTION

Figure 1:
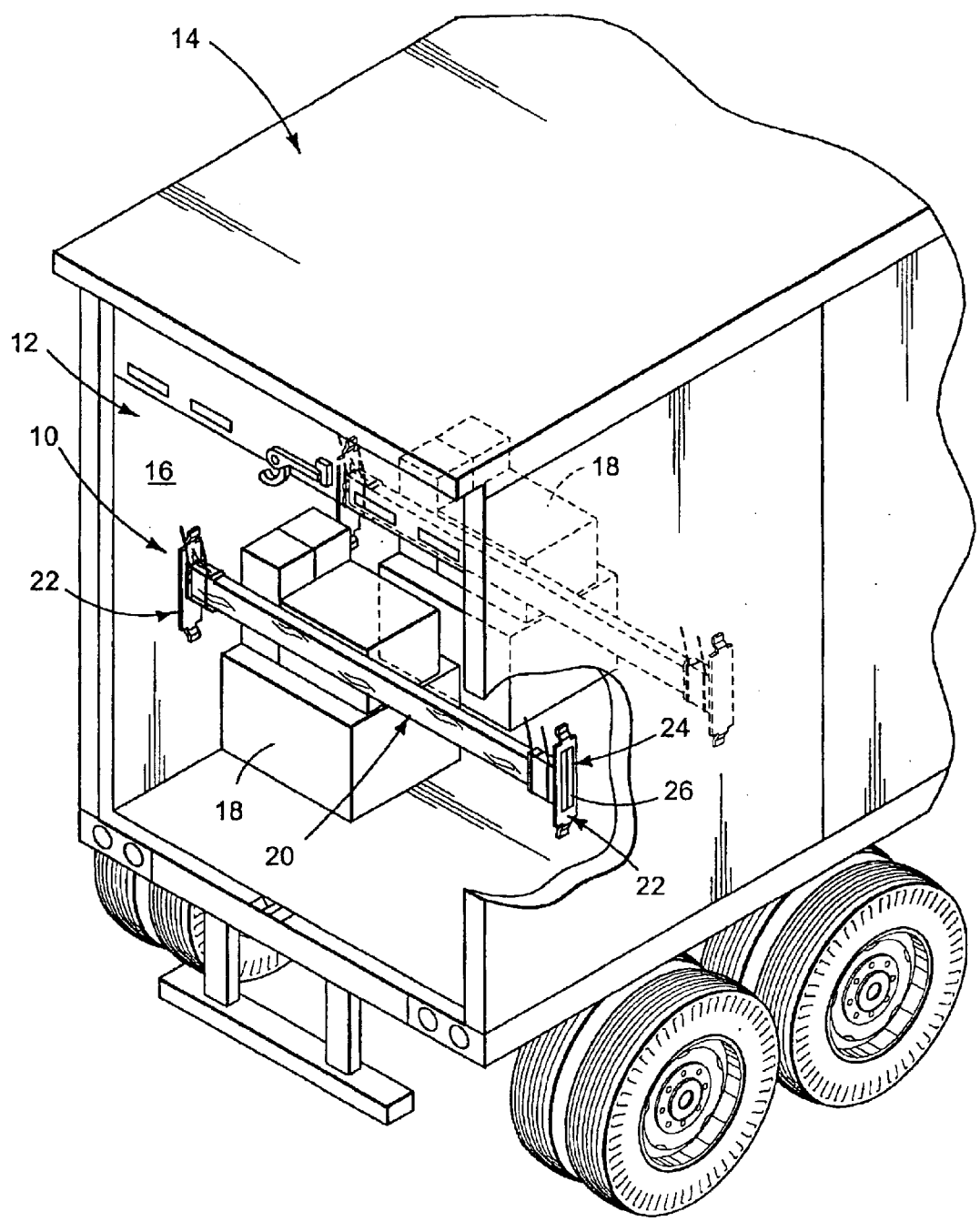
FIG. 1 depicts an exemplary cargo compartment of a vehicle, including a cargo retaining system according to the present description.

FIG. 1 depicts a cargo positioning system according to the present description, as deployed in an exemplary cargo area. As shown, the system may include a retainer assembly 10, which may be deployed within a cargo area 12 of vehicle 14. Vehicle 14 may be a truck or semi-trailer having an internal cargo area or an exposed flatbed cargo area. Exemplary cargo area 12 has side walls 16 capable of retaining cargo 18, such as boxes. The disclosed cargo retainer assembly is selectively removable, and may be reused and/or reinstalled in various locations within cargo area 12.

Exemplary cargo retainer assembly 10 includes an elongate retaining member 20 that may be retained by at least one retaining member support 22, as shown in FIG. 1. Thus, the retaining member crosses the cargo area and restricts movement of the cargo past the position of the retaining member. One or more retaining member supports may be selectively positioned along side walls 16 to allow placement of the retaining member at any appropriate intermediate location.

Retaining member 20 may be a two-by-four wood board, as shown in the illustrative example of FIG. 1. However, this disclosure is not limited to such a board and numerous other materials will suffice for use as a retaining member, such as metal bars, PVC piping, and the like. Additionally, the retaining member may be of any desirable cross-section or dimension, though it will normally be desirable that the retaining member be long enough to extend between opposing retaining member supports.

Figure 2:
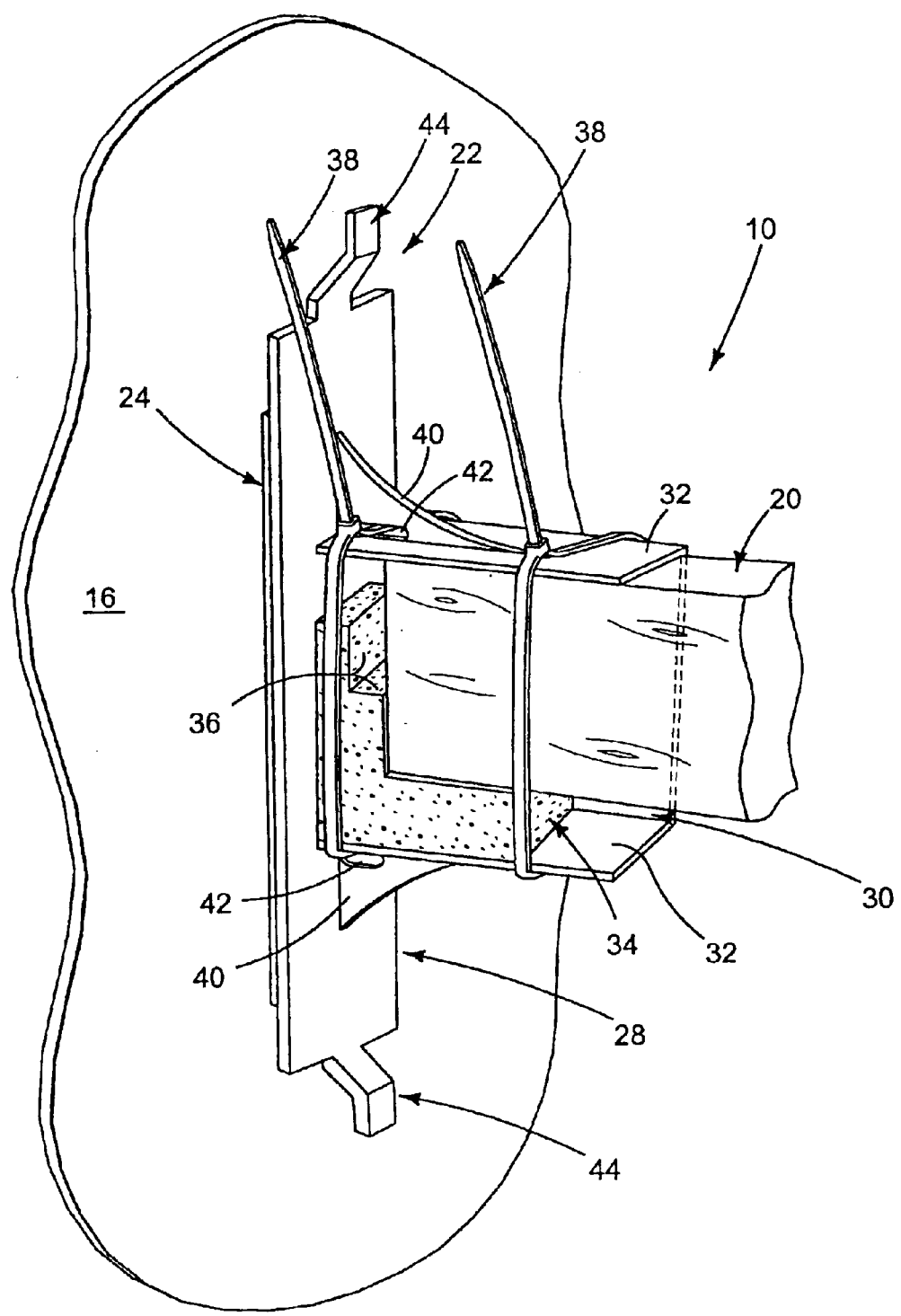
FIG. 2 is an enlarged view of the cargo retainer assembly shown in FIG. 1, showing a cargo-facing side of the retainer assembly.
Figure 3:
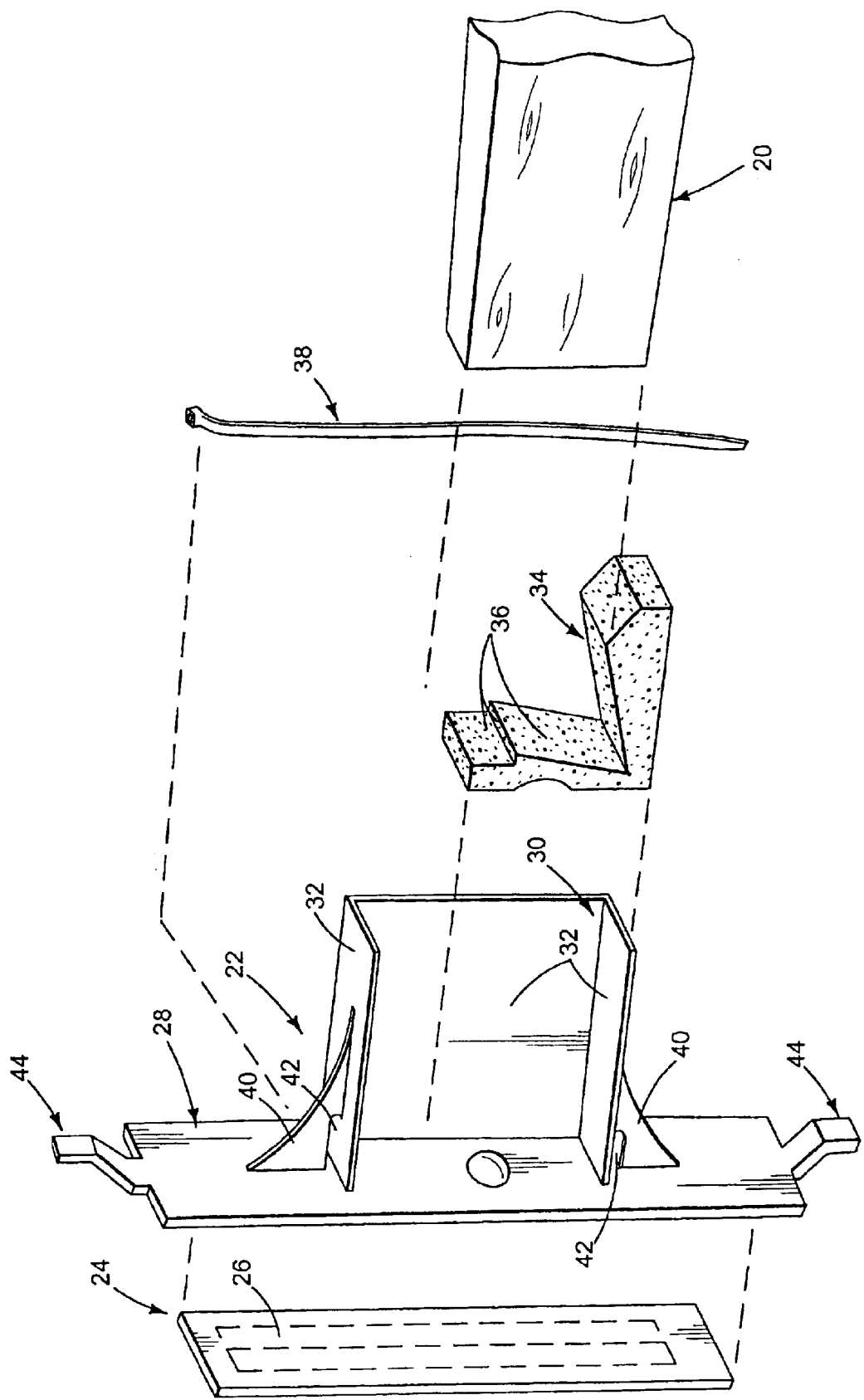
FIG. 3 is an exploded view of the cargo retainer assembly of FIG. 1, depicting exemplary embodiments of a retaining member, retaining member support, spacer, and fastener according to the present description.

As shown in FIG. 2, and in further detail in FIG. 3, retaining member support 22 may be removably secured to walls 16 with an adhesive 24, such as double-sided tape. Adhesive 24 typically is covered with a perforated backing paper 26. The perforations may be arranged in rows or checkerboard patterns, to allow only a portion of adhesive 24 to be exposed at a time, for example in strip-like fashion, as depicted by dashed lines in FIG. 3. Exposing only a portion of adhesive 24 allows multiple uses of retaining member support 22. Any adhesive previously exposed may be left exposed, without impacting the use of the device, and fresh adhesive may be exposed to increase the holding power of adhesive 24. Alternatively, it should be appreciated that many other suitable non-permanent methods may be used to secure the retaining member supports to the compartment, including VELCRO hook and loop fasteners, snaps, clips, and the like.

Figure 4:
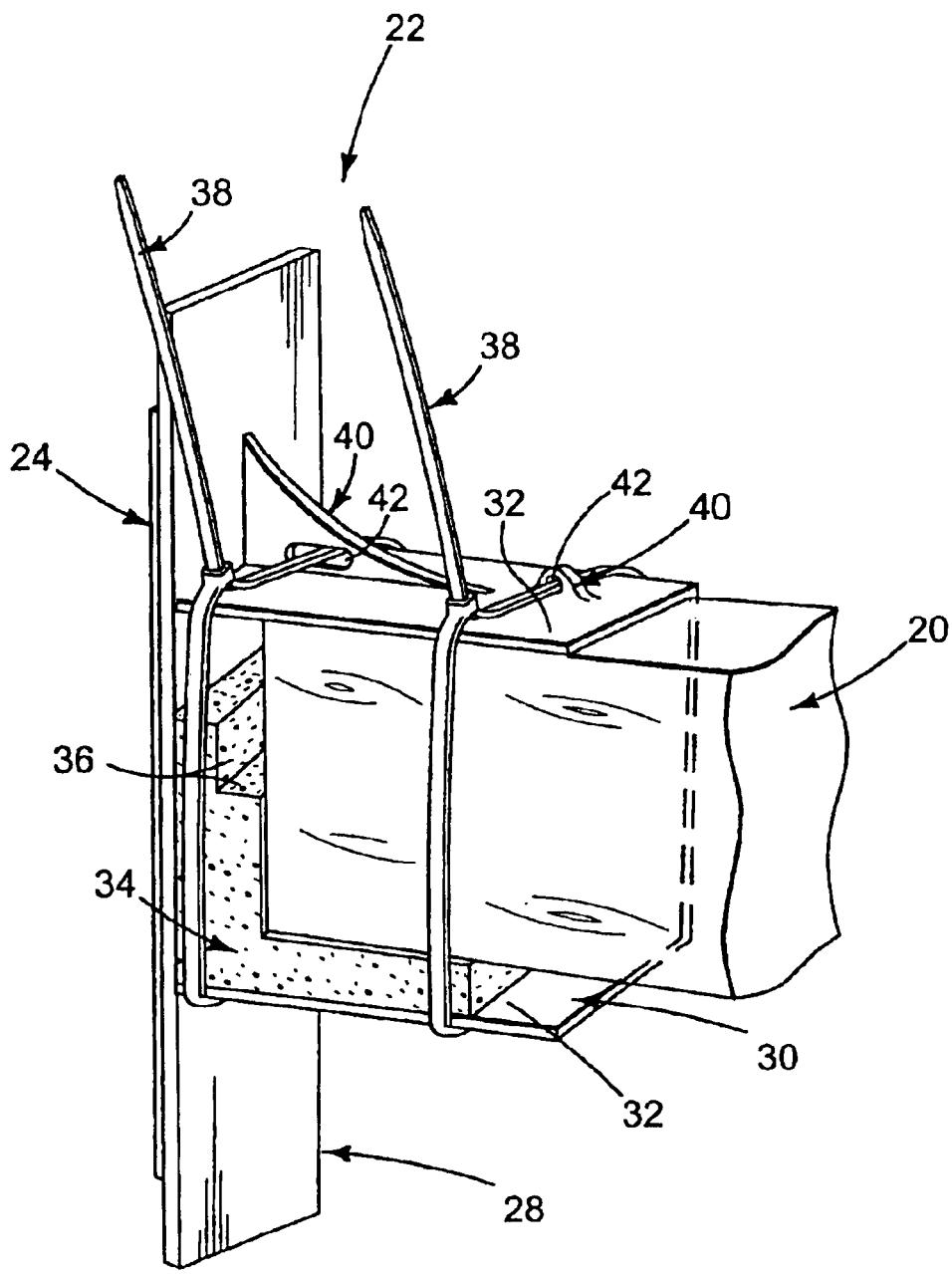
FIG. 4 shows a variation of the cargo retainer assembly, including a second flange to secure an additional fastener to the retaining member support.

Retaining member supports 22 may take the form of a bracket, as shown in FIGS. 2–4. In such a configuration, retaining member support 22 includes a mount portion 28, such as a plate, to which adhesive 24 adheres retaining member support 22 to wall 16. Retaining member support 22 may be made from an injection molded thermoforming resin such as acrylonitrile butadiene styrene (ABS) or high impact polystyrene (HIPS), although it should be appreciated that other materials may be used.

Typically, retaining member support 22 also includes a receiving region 30, which may be formed by several wall sections 32, as shown in FIGS. 2 and 3. These wall sections form a pocket that receives an end of retaining member 20 and limits translation of retaining member 20. Although the receiving region shown has a C-shaped cross-section, it should be appreciated that the pocket formed by receiving region 30 typically has an open side, regardless of the cross-section, to accommodate lateral insertion (e.g., perpendicular to the length of the retaining member) of retaining member 20. Thus, receiving region 30 may be U- or L-shaped. Retaining member 20 generally rests against wall sections 32, such as a top wall and a back wall, as shown in FIG. 2. The open-sided construction of the retaining member support allows retaining member 20 to be engaged with the supports after the supports have been affixed to a desired location within the cargo compartment.

Although the components of retaining member support 22 are shown as being integrally formed, it is within the scope of this disclosure that the components be independent pieces held together by suitable fasteners, including screws, bolts, clasps, pins, and the like.

In some embodiments, cargo retainer assembly 10 includes at least one removable spacer 34, such as a die-cut open cell foam insert, as shown in FIGS. 2–4. Spacer 34 is configured to fill unused space between retaining member 20 and retaining member support 22. Spacer 34 is therefore typically made of a resilient elastic material so that spacer 34 may be compressed between retaining member 20 and retaining member support 22 while returning to its original configuration for subsequent use. In some embodiments, spacer 34 may be sized to substantially fill receiving region 30 between retaining member support 22 and retaining member 20 to maintain a snug fit therebetween. As depicted, spacer 34 is sized and shaped to contact retaining member 20 on two adjacent sides or edge surfaces to reduce gaps between retaining member 20 and wall sections 32, which bound an define receiving region 30.

As shown in FIG. 3, spacer 34 may have contoured mating regions 36 that are configured to engage with the multiple sizes and shapes which retaining member 20 may take. The spacer shown is L-shaped so that each of the two legs of the "L" contacts the retaining member. In such a configuration, one leg supports the end of the retaining member while the other leg supports the bottom of the retaining member. In some embodiments, it will be desirable to provide each leg or segment of the spacer with a different size and/or contour. Different size retaining members can then be accommodated simply by rotating the spacer within the receiving region 30 of the retaining member support. For example, for boards having certain dimensions, it may be desirable to have a spacer with greater vertical dimensions, so as to take up more vertical space within the pocket defined by the retaining member support. For other board dimensions, less vertical spacing may be required. Spacer 34 can be configured as described to accommodate such dimensional variations.

Spacer 34 may include several separate pieces that assemble in a puzzle-like fashion, or be a single piece having multiple contours, the latter of which is shown in FIG. 3. Alternatively, spacer 34 may be integrally formed with retaining member support 22 and may further include movable segments, such as spring-loaded buttons, capable of being depressed to adjust contour 36 of spacer 34.

In some embodiments, at least one fastener 38 is used to secure retaining member 20, support 22, and spacer 34 together, as illustrated in FIGS. 2 and 4. Fasteners 38, such as plastic or wire ties, may be provided together with cargo retainer assembly 10, or as a separately purchased item, and may include any fastening mechanism adapted to fasten retaining member 20 and spacer 34 within retaining member support 22. Fasteners 38 may include hinged clips that rotate to close the open portion of receiving region 30 and snap or latch to an opposite end of the opening. In the case of a U-shaped bracket, in which the opening faces upwards, fastener 38 may not be required. In some embodiments, spacer 34 may include a plate that snaps into locking engagement with bracket 30 so that fastener 38 and spacer 34 are integrally formed.

Although mounting of retaining member support 22 may occur so that the opening in the receiving region faces either away from or toward cargo 18, it is generally preferable that the opening faces the cargo, as shown previously in FIG. 1. Fasteners 38 may not otherwise be strong enough to withstand an impact to retaining member 20 should cargo 18 shift during transport.

In embodiments where fastener 38 takes the form of ties, as shown in FIGS. 2–4, retaining member support 22 may include reinforcing flanges 40 with apertures 42 to provide anchor points for fasteners 38 to prevent sliding of the ties off of retaining member support 22. As shown in FIGS. 2–4, the fastener closest to side wall 16 passes through aperture 42, thereby preventing fastener 38 from sliding away from mount portion 28 and off of retaining member support 22. Although the flanges and apertures shown in FIGS. 2 and 3 are present on opposite edges of retaining member support 22, it should be appreciated that only one flange and aperture is required for each fastener 38, as shown in FIG. 4. Additionally, there may be apertures provided for each of fasteners 38 used so that at least one of apertures 42 is spaced a distance away from mount portion 28, also shown in FIG. 4.

To facilitate removal of retaining member support 22 from vehicle 14, retaining member support 22 may include gripping members, such as handles 44. As shown in FIGS. 2 and 3, handles 44 protrude from retaining member support 22 once it is mounted to walls 16 to provide sufficient space for a user to fit his or her fingers underneath at least a portion of retaining member support 22. Thus, a user is able to easily pry or twist retaining member support 22 away from wall 16 to either remove, or adjust the position of, retaining member support 22. Changing the support mounting location from a left to a right side wall of the vehicle is accomplished simply by rotating the support and spacer 180 degrees.

FIG. 4 depicts alternate embodiments of retaining member support 22 and spacer 34. Support 22 has a smaller aperture 42 than in the previous examples. Additionally, an aperture is shown displaced away from mount portion 28, as previously described. Although spacer 34 may be sized to match the receiving region dimensions, it is not necessary that all dimensions be matched. Also, because receiving region 30 protrudes from retaining member support 22, a user may grip receiving region 30 to remove retaining member support 22 without using handles 44. However, it will often be desirable that at least one handle 44 be used to limit fatigue at the junction between receiving region 30 and mount portion 28. Thus, handles 44 may be located at the extremes of mount portion 28, as previously shown in FIGS. 2 and 3.

The following describes a typical installation procedure. First, a user determines where retaining member support 22 should be mounted after cargo compartment 14 has been loaded. For example, if the cargo compartment is only half full then retaining member support 22 should be mounted at an intermediate location, such as a half-way point, along the depth of the cargo compartment. Retaining member support 22 is therefore located adjacent to cargo 18, as shown previously in FIG. 1. The compartment width will determine the length of retaining member 20 required to span between supports 22. Perforated backing paper 26 is removed from adhesive 24 and support 22 is mounted in the location desired on side wall 16. Support 22 is typically mounted with handles 44 extending vertically. Spacer 34 is inserted into support 22 in an appropriate orientation to match the retaining member geometry. Next, retaining member 20 is inserted and the proper location on the opposing wall is marked or visually determined. Once a support has been mounted on the opposing wall, retaining member 20 and spacer 34 are secured with fasteners 38. At least one of fasteners 38 may be inserted through apertures 42 to prevent sliding of fastener 38. Thus, cargo 18 is ready for transport.

It is believed that the disclosure set forth above encompasses multiple distinct inventions with independent utility.

While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where any claim recites "a" or "a first" element or the equivalent thereof, such claim should be understood to include incorporation of one or more such elements, neither requiring nor excluding two or more such elements.

Inventions embodied in various combinations and subcombinations of features, functions, elements, and/or properties may be claimed through presentation of new claims in a related application. Such new claims, whether they are directed to a different invention or directed to the same invention, whether different, broader, narrower or equal in scope to the original claims, are also regarded as included within the subject matter of the inventions of the present disclosure.

I claim:

1. A cargo retainer assembly for a cargo compartment of a vehicle, the cargo retainer assembly comprising:
    an elongate retaining member;
    a retaining member support configured to be secured to a wall of the cargo compartment and having a receiving region adapted to receive an end of the retaining member; and
    a spacer configured to be selectively and laterally inserted into and removed from the receiving region, the spacer being shaped and sized to contact the retaining member on two adjacent sides of the retaining member to thereby reduce gaps between the retaining member and wall sections which bound and define the receiving region.

2. The cargo retainer assembly of claim 1, wherein the retaining member, once secured within the receiving region, is adapted to inhibit shifting of cargo within the cargo compartment.

3. The cargo retainer assembly of claim 2, wherein the wall sections of the receiving region form a pocket adapted to receive the retaining member and limit movement of the retaining member.

4. The cargo retainer assembly of claim 3, wherein the pocket is open on a side so as to permit lateral insertion of the end of the retaining member into the receiving region.

5. The cargo retainer assembly of claim 4, further comprising a fastener adapted to secure the end of the retaining member and the spacer within the receiving region.

6. The cargo retainer assembly of claim 5, wherein the retaining member support has an aperture adapted to allow passage of the fastener through the aperture so that the fastener is inhibited from sliding lengthwise relative to the retaining member.

7. The cargo retainer assembly of claim 1, wherein the retaining member has a length sufficient to span between opposing side walls of the cargo compartment.

8. The cargo retainer assembly of claim 7, further comprising a second retaining member support, wherein the two retaining member supports are adapted to be mounted to the opposing side walls of the cargo compartment, such that the retaining member supports receive and retain opposing ends of the retaining member.

9. The cargo retainer assembly of claim 8, wherein the retaining member supports are selectively removable and adapted to be placed at intermediate locations along the opposing side walls.

10. The cargo retainer assembly of claim 1, wherein the retaining member support is removably secured to the wall of the cargo compartment with adhesive.

11. The cargo retainer assembly of claim 1, wherein the retaining member support has a handle adapted to be gripped by a user for manipulation and placement of the retaining member support.

12. The cargo retainer assembly of claim 1, wherein the spacer may be placed in multiple different orientations within the receiving region to accommodate retaining members of different sizes.

13. The cargo retainer assembly of claim 12, wherein the spacer has two legs, substantially perpendicular to one another, and having different contours so that each leg has a unique shape and size.

14. The cargo retainer assembly of claim 13, wherein one of the legs of the spacer is adapted to support an end surface of the retaining member, and the other of the legs of the spacer is adapted to support an adjacent bottom surface of the retaining member.

15. The cargo retainer assembly of claim 1, wherein the spacer is made from foam.

16. A cargo area, comprising:
    a side wall; and
    a cargo positioning system adapted to limit fore and aft movement of cargo disposed within the cargo area, the cargo positioning system comprising:
    a retaining member;
    a retaining member support having a receiving region sized to receive an end of the retaining member and adapted to be removably secured at a location along the side wall; and a removable spacer insertable within the receiving region and adapted to urge the retaining member against the retaining member support, wherein the spacer is positionable between a portion of the retaining member and the retaining member support so as to contact adjacent sides of the retaining member.

17. The cargo area of claim 16, further comprising a fastener adapted to secure the end of the retaining member and the spacer relative to the retaining member support.

18. The cargo area of claim 17, wherein the retaining member support has an aperture adapted to allow passage of the fastener through the retaining member support so that the fastener is inhibited from sliding lengthwise relative to the retaining member.

19. The cargo area of claim 16, wherein the retaining member is removably secured to the wall with double-sided tape having multiple sections adapted to be used multiple times by sequential removal of a backing strip on each of the multiple sections.

20. The cargo area of claim 16, wherein the retaining member support has a handle adapted to be gripped by a user for manipulation and placement of the retaining member support.

21. The cargo area of claim 16, wherein the spacer has two legs each being uniquely contoured so that the spacer is adapted to accommodate different retaining member sizes by varying the orientation of the spacer within the receiving region of the retaining member support.

22. The cargo area of claim 16, wherein the spacer is made of an elastic material.

23. A method of securing cargo within a cargo compartment by placing a retaining member within the cargo compartment to inhibit fore and all movement of the cargo, the method comprising:

securing a retaining member support, having a receiving region, to a wall of a cargo area using adhesive;

placing an end of the retaining member within the receiving region; and inserting a spacer within the receiving region, wherein the spacer is configured to contact adjacent edge surfaces of the retaining member to take up excess space within the receiving region of the retaining member support.

24. The method of claim 23, further comprising wrapping a fastener around the retaining member, the retaining member support, and the spacer to restrict relative movement therebetween.

25. The method of claim 24, wherein the fastener passes through an aperture in the retaining member support and is thereby restricted from moving lengthwise relative to the retaining member.

26. The method of claim 23, further comprising grasping a handle to selectively remove the retaining member support from the wall of the cargo area.

27. The method of claim 23, further comprising securing a second retaining member support to an opposing wall of the cargo area and placing an opposing end of the retaining member within the second retaining member support, such that the retaining member spans a width of the cargo area.

28. The method of claim 27, wherein the first and second retaining member supports are removably secured in place using a multiple-use adhesive.

29. The method of claim 28, further comprising moving the supports to an intermediate location along a length of the cargo area to account for the cargo area being only partly full of cargo.

30. A cargo retainer assembly for a cargo compartment of a vehicle, the cargo retainer assembly comprising:

an elongate retaining member;

a retaining member support configured to be secured to a wall of the cargo compartment and having a receiving region adapted to receive an end of the retaining member, wherein the receiving region has an open side to permit lateral insertion of the end of the retaining member into the receiving region; and a spacer configured to be selectively inserted into and removed from the receiving region to selectively reduce gaps between the retaining member and the receiving region, wherein the spacer is adapted to urge the retaining member against the retaining member support.

31. The cargo retainer assembly of claim 30, wherein the spacer is shaped to contact adjacent edge surfaces of the retaining member.

32. The cargo retaining assembly of claim 31, wherein the adjacent edge surfaces of the retaining member are perpendicular to one another.

* * * * *